United States Patent
Asakawa et al.

(10) Patent No.: US 6,985,147 B2
(45) Date of Patent: Jan. 10, 2006

(54) INFORMATION ACCESS METHOD, SYSTEM AND STORAGE MEDIUM

(75) Inventors: Chieko Asakawa, Kawasaki (JP); Hironobu Takagi, Tokyo-to (JP); Hiroshi Nomiyama, Kawasaki (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/013,881

(22) Filed: Dec. 11, 2001

(65) Prior Publication Data

US 2004/0246237 A1 Dec. 9, 2004

(30) Foreign Application Priority Data

Dec. 15, 2000 (JP) ............................. 2000-382588

(51) Int. Cl.
*G06T 11/00* (2006.01)

(52) U.S. Cl. ....................................... 345/467; 382/185

(58) Field of Classification Search ................ 345/171, 345/467; 382/187, 177, 181, 185, 224, 229; 704/9, 530

See application file for complete search history.

(56) References Cited

U.S. PATENT DOCUMENTS 5,535,119 A * 7/1996 Ito et al. ........................ 704/3

FOREIGN PATENT DOCUMENTS

| JP | 10078955 | * | 3/1998 |
| JP | 10149355 | * | 6/1998 |

* cited by examiner

*Primary Examiner*—Dennis-Doon Chow
(74) *Attorney, Agent, or Firm*—Louis P. Herzberg

(57) ABSTRACT

The present invention provides effective information search means, and/or effective acquired information submission means, without overtly expressing an intent (e.g., through the depression of a search button) to acquire information. In an example embodiment, the kana-kanji conversion routine is activated, and a character string is input using voice, a keyboard or a graphic entry process. Then, a conversion key is depressed to convert the input character string into kanji. Upon the depression of the conversion key, the homonym candidate selection routine is initiated, and the conversion candidate is presented. In response to the depression of the conversion key, or the change of the conversion candidate in the homonym candidate selection routine, the information access routine is activated. Then, the information access procedure is performed, and the search results are acquired. Thereafter, the search results are presented.

25 Claims, 14 Drawing Sheets

| Internal name | Name | Access module name | Key type | Parameter |
|---|---|---|---|---|
| KOKUGO_JISHO | Japanese dictionary | TEXT_DICTIONARY | STEMMING(JPN) | kokugo.dct |
| NEWS_INFORMATION | Latest news | TEXT_DICTIONARY | WORD | siteoutlinerNews.dct |
| SITE1_SEARCH | Search site 1 | TRANSCODING_PROXY | WORD | http://search.site1.co.jp/bin/search?p= |
| SITE2_SEARCH | Search site 2 | TRANSCODING_PROXY | WORD | http://www.site2.ne.jp/default.asp?NT= |
| TANKANJI_JISHO | Single kanji dictionary | TEXT_DICTIONARY | WORD | tankan.dct |
| ENGLISH_AUDIO_DICTIONARY | English voice | AUDIO_DB | STEMMING(ENG) | audioEnglish.db |
| ENGLISH_DICTIONARY | English dictionary | TEXT_DICTIONARY | STEMMING(ENG) | english.db |

| Access module name | Timing | Beep tone | Synthesis sound quality | Sound output method | Contents display key | Output text through speech synthesis |
|---|---|---|---|---|---|---|
| USER_DICTIONARY | ALWAYS | NO_BEEP | FEMAIL_VOICE(0) | STEREO | | |
| USER_AUDIO_DICTIONARY | ALWAYS | NO_BEEP | NA | STEREO | | |
| KOKUGO_JISHO | ALWAYS | NO_BEEP | FEMALE_VOICE(1) | STEREO | | |
| NEWS_INFORMATION | ALWAYS | BEEP(1,1,0) | FEMALE_VOICE(3) | STEREO | | |
| COMPUTER_DICTIONARY | ALWAYS | BEEP(2,2,0) | FEMALE_VOICE(3) | LEFT | CTNL+LEFT | % K for computer terms |
| SITE1_SEARCH | IFREQUESTED | BEEP(3,1,-1) | FEMALE_VOICE(3) | STEREO | NA | |
| SITE2_SEARCH | IFREQUESTED | BEEP(4,1,1) | FEMALE_VOICE(3) | STEREO | CTNL+DOWN | |
| TANKANJI_JISHO | CATCH_ALL | NO_BEEP | MALE_VOICE(1) | LEFT | CTNL+DOWN | |
| KANA_JISHO | CATCH_ALL | NO_BEEP | MALE_VOICE(2) | STEREO | | |
| POS_INFORMATION | CATCH_ALL | NO_BEEP | MALE_VOICE(2) | RIGHT | NA | % K for % S |
| ENGLISH_AUDIO_DICTIONARY | CATCH_ALL | NO_BEEP | NA | RIGHT | | |
| ENGLISH_DICTIONARY | CATCH_ALL | NO_BEEP | MAKE_VOICE(3) | LEFT | | |
| ALHA_NUMERIC_JISHO | CATCH_ALL | NO_BEEP | MALE_VOICE(2) | | NA | % K for % S |

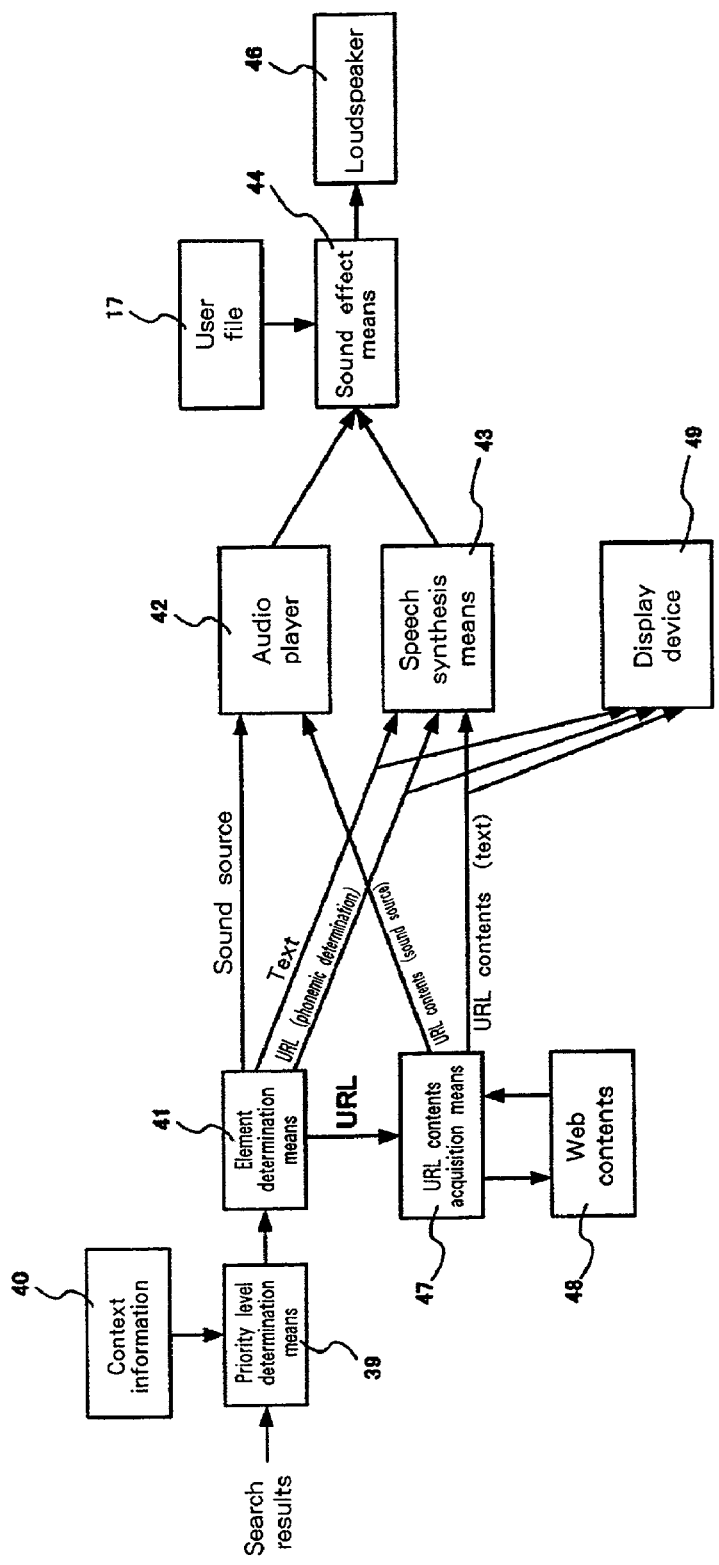

INFORMATION ACCESS METHOD, SYSTEM AND STORAGE MEDIUM

FIELD OF THE INVENTION

The present invention relates to an information access method and an information access system. More particularly it relates to techniques used for seamless information acquisition means for visually impaired persons, or information acquisition means for information terminals having a small screen or no screen.

BACKGROUND ART

For an information search a user employs search queries to search for desired material available at information sources. For information acquisition a user employs a variety of means, including net surfing that does not reflect any particular user intent, so as to acquire beneficial information. Generally, an information search system or an Internet web search can satisfy these kinds of requests for information. For such a search, a search keyword must be entered and transmitted to the computer system.

In a computer system having a general GUI (Graphical User Interface), a field for keyword entry is provided on a display screen. To input an entry, a cursor is moved to the input field by using a pointing device, such as a mouse. Thereafter, a search keyword is entered by using an input device, such as a keyboard, and a transmission button (submit button) is depressed to transmit the keyword to the computer system. As a result, the search keyword is transmitted to the computer system, whereat a computer system performs predetermined procedures for a search associated with the keyword. Text, an image or sound data, obtained as a result of the search, are presented to the user on the display screen, or by sound.

As a system for supporting information acquisition, a system is available for providing annotation for a word on a web browser. Examples of this are "ThirdVoice", described in "http://www.thirdvoice.com", or "FlySwat", described in "http://www.flyswat.com". These are not specific and active information acquisition methods for entering a keyword and searching for information, but rather are methods for providing annotation, such as company information, for a word, such as an organization name or a product name, that appears on a current page, and for non-specifically and passively presenting information.

Further, in an information search system using a kana-kanji conversion as a front end, there is "iATOK" described in "http://www.iatok.com". This is a system whereby kana-kanji conversion is performed for a word that is entered to find a corresponding URL (Uniform Resource Locator). For example, when a specific company name is entered, the URL of the company is returned.

However, general computer systems are designed for use by persons with normal sight, and use by those who are sight limited. That is, since a visually impaired person can, at the best, perceive only part of the information that is presented two-dimensionally using a GUI, when performing an information search, such a person must perforce depend on his or her apprehension of a time series oral rendition of text, provided by a speech synthesis system using software and hardware, to ascertain its contents. For example, when a visually impaired person enters the form of a web page using a voice controlled browser or a screen reader, generally the succeeding user interface must be employed. First, a cursor must be moved to an input box using a pointing device, such as a mouse, and the input box selected (clicked on). Then, once a character string input dialogue box (an input field) appears, a character string must be input and the enter key depressed. Following this, the cursor must be moved to a submit button (transmission button) and the enter key depressed. This is the manner in which a visually impaired user must search for information when using a conventional computer system and appropriate software. In the event, however, depending on the page design, it is not easy to identify what kind of input field a text box is. Further, it may be difficult to find the position of a submit button because it may be located at an arbitrary position on a web form. In addition, since the page obtained as the result of a search may include much unrelated information, such as advertisements or link listings, the locating of the search results depends entirely on the experience of a user. Therefore, the user must spend much time locating input fields and information, and inputting a keyword.

Furthermore, since the annotation for an information acquisition support system is provided on the assumption that a two-dimensional display will be used, it does not provide effective information acquisition support for a visually impaired person for whom simply obtaining position information presented on a screen may be difficult or impossible.

In addition, an information search system for performing kana-kanji or other conversion as a front end merely employs a URL as a search target, and can not return other information. Further, since this system is designed for persons with normal sight, in addition to the information acquisition support system, this system does not provide effective information acquisition support for visually impaired persons.

That is, when a visually impaired person wishes to use a computer system to acquire information or to search for information, that user is faced with two difficulties: one involves the identification of an area for the entry of a keyword and the positioning of a button, and the other involves the extraction of necessary information from a page obtained as a result of a search. Since a visually impaired person accesses a computer by using one-dimensional output, i.e., the voice, it is difficult for that person to identify position information presented on a screen. Therefore, another difficulty accompanies the method employed for accessing information when using a web browser (GUI) that is designed for two-dimensional perception.

SUMMARY OF THE INVENTION

It is, therefore, one aspect of the present invention to provide a computer system and an information search method whereby a visually impaired person can easily search for and acquire information.

It is another aspect of the present invention to provide a computer system and an information search method for enabling the search for and acquisition of information by a user of an information device, such as a portable telephone or a PDA (Personal Digital Assistants), having a small display area, or a terminal, such as a common telephone set, that is not normally equipped with a display device.

It is an additional aspect of the present invention to provide effective information search means or effective acquired information submission means without overtly expressing an intent (e.g., through the depression of a search button) to acquire information.

In an example embodiment of the present invention, when kana-kanji or other conversion or homonym selection using the kana-kanji conversion module is performed, the acquisition of information related to a selected candidate is automatically initiated. The input operation for the acquisition of information is simplified. Especially for a visually impaired person, the load imposed by an input operation is reduced, and a system that affords superior accessibility can be constructed.

In a further example embodiment of this invention, acquired information is presented by a voice. To do this, sound effects, such as tone quality and volume, are intrinsically associated with the information or the information attribute, and more information is uniformly presented by varying the effects produced by the sound elements. Therefore, accessed information can be effectively presented even by the small display screen available with a portable information terminal having a small display screen or by a common telephone set that normally does not have a display screen.

BRIEF DESCRIPTION OF THE DRAWINGS

These and other aspects, objects, features, and advantages of the present invention will become apparent upon further consideration of the following detailed description of the invention when read in conjunction with the drawing figures, in which:

FIG. 4 is a table showing an example information source definition file;

FIG. 5 is a table showing an example user profile;

FIG. 6 is a block diagram showing example results presentation means;

DESCRIPTION OF THE SYMBOLS

Figure 1:
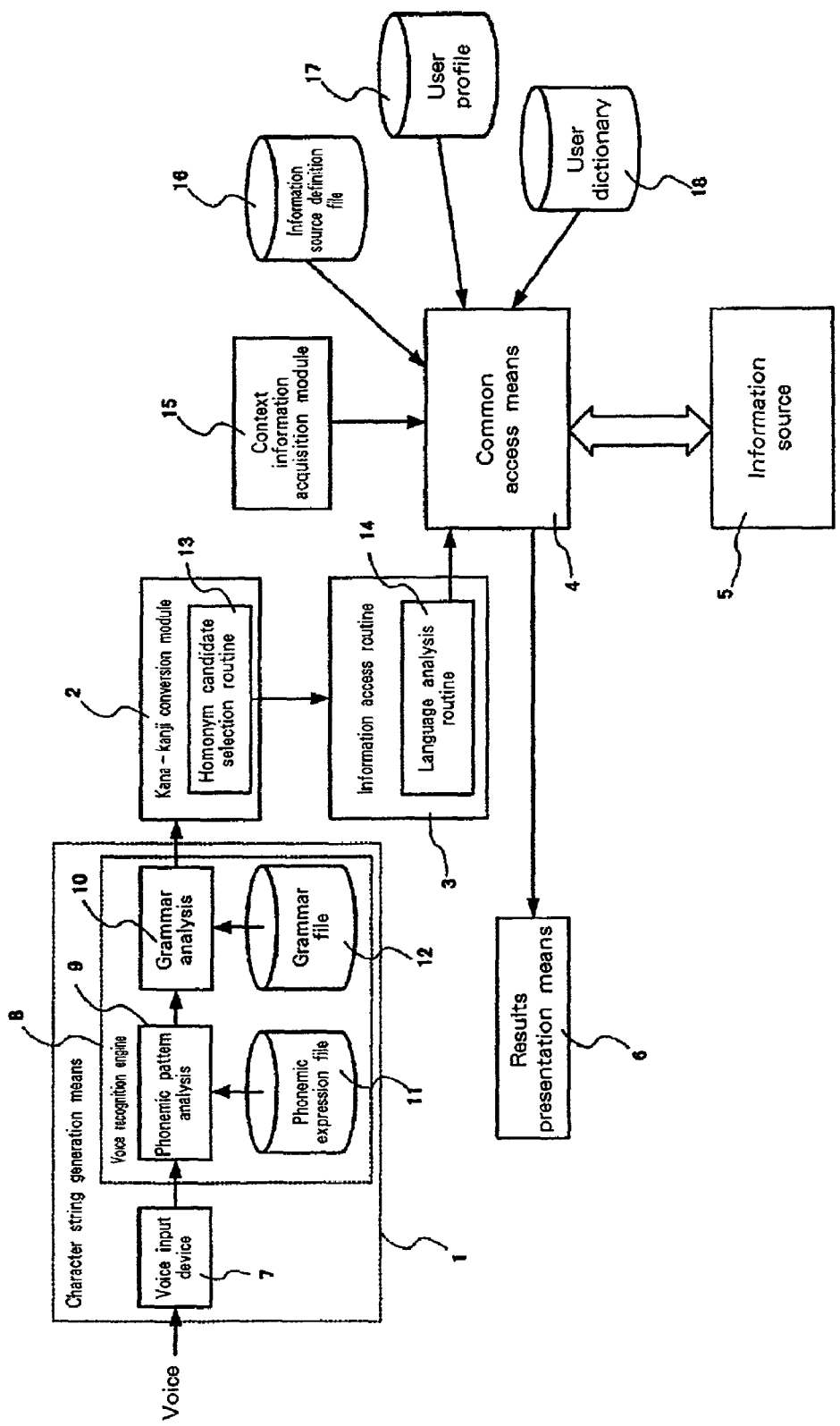
FIG. 1 is a block diagram showing an example information access system according to one embodiment of the present invention.

1: Character string generation means
2: Kana-kanji conversion module
3: Information access routine
4: Common access means
5: Information source
6: Results presentation means
7: Voice input device
8: Voice recognition engine
9: Phonemic pattern analysis means
10: Grammar analysis means
11: Phonemic expression file
12: Grammar file
13: Homonym candidate selection routine
14: Language analysis routine
15: Context information acquisition module
16: Information source definition file
17: User profile
18: User dictionary
19: Language analysis means
20: Base form generation means
21: Kana dictionary
22: Alphanumeric dictionary
23: Part-of-speech information
25: Single kanji dictionary
26: Japanese dictionary
27: Document DB
28: Sound file DB
29 to 32, 36, 37: Access routine
33, 34: Web server
35: Internet
38: Proxy server
39: Priority level determination means
40: Context information
41: Element determination means
42: Audio player
43: Speech synthesis means
44: Sound effect means
46: Loudspeaker
47: URL contents acquisition means
48: Web contents
49: Display device
105: Handwriting input device
106: Scanner
107: Character pattern analysis means
108: Character pattern file
110: Keyboard
111: Ten-key board
112: Input trap
114: Character string input means
115: Blank detection means

DESCRIPTION OF THE INVENTION

An overview of the present invention will now be given. When kana-kanji or other conversion, or homonym selection using the kana-kanji conversion module is performed, the acquisition of information related to a selected candidate is automatically initiated. In example embodiments of the invention, the input operation for the acquisition of information is simplified. And especially for a visually impaired person, the load imposed by an input operation is reduced, and a system that affords superior accessibility can be constructed. It should be noted that in the English input mode, the kana-kanji conversion, or the homonym selection in the kana-kanji conversion can be replaced with the detection of blanks (spaces) in the input character string to initiate the information access.

Further, in this invention, acquired information is presented by a voice. To do this, sound effects, such as tone quality and volume, are intrinsically associated with the information or the information attribute, and more information is uniformly presented by varying the effects produced by the sound elements. Therefore, accessed information can be effectively presented even by the small display screen available with a portable information terminal having a small display screen or by a common telephone set that normally does not have a display screen. Especially for visually impaired persons who can not perceive information presented in two-dimensions, such as on screen, an extremely convenient system can be provided. The present invention will be specially enumerated as follows.

Another example of an information access method according to the present invention comprises the steps of: activating a kanji conversion module for converting a character or a character string into a kanji or into a character string that includes kanji; entering a character or a character string; using the kanji conversion module to instruct the conversion of the character or the character string; employing, as a trigger, an instruction, or the selection of one of multiple conversion candidates presented by the kanji conversion module, in order to obtain, from an information source, information related to a conversion candidate that has been instructed or selected; and using voice, or added sound effects, when presenting the obtained information.

An example of an information access method according to the invention comprises the steps of: entering a character or a character string; determining whether a control character is included in the character or the character string; employing, as a trigger, detection of the control character to obtain, from an information source, information concerning a word that is delimited by the control character; and using voice, or added sound effects, when presenting the obtained information. The control character is one of a space, a blank, a tab, a carriage return or a line feed, or a combination thereof.

According to the example information access method, the character or the character string is entered using a first method based on voice recognition, a second method based on graphic character recognition, or a third method based on the use of a keyboard or a ten-key board. The step of obtaining the information includes steps of: performing a language analysis process, including one or multiple procedures employed for parsing a compound word included in a conversion candidate, a procedure for analyzing a part of a word included in a conversion candidate or a word delimited by the control character, and a procedure for obtaining the base form of a word included in a conversion candidate or of a word delimited by the control character; and searching the information source by using, as a key, the word included in a conversion candidate, the word delimited by the control character, the word obtained through language analysis, or the base form thereof.

The information source is a local database or a global database, connected to the Internet, in which text data, sound data or URL data are stored. The step of obtaining the information includes the steps of: setting the information source while referring to a priority level recorded in a user profile; setting a search key to be used for the information source while referring to an information source definition file; and determining whether a search timing for the information source matches a condition for a search, and performing the search when the decision is affirmative.

The step of presenting the obtained information includes the steps of: establishing an information presentation order while referring to the priority level recorded in the user profile or to context information for a user; employing tone, volume or another sound effect to represent the number or quantities of information sources from which information has been acquired; and changing the information presentation order at the time whereat a user enters a specific key.

The step of presenting the obtained information includes the steps of: identifying the type of information or an element thereof; and using voice to output text data or a text portion of data associated with a URL when it is ascertained that the information or the element is the text data or the URL, or replaying sound data or sound data included in the URL when it is ascertained that the information or the element is the sound data or the URL. Further, when it is ascertained that the information or the element is the URL, the information to the effect that the information or the element is the URL is presented, and then, upon the receipt of a request from a user, data associated with the URL is obtained.

The step of presenting the obtained information includes a step of presenting, upon the receipt of a request from a user, a source of the obtained information that constitutes an information authority.

The present invention can also be provided as an information access system for carrying out the information access method, or a storage medium on which a program for carrying out these functions is stored.

An advantageous embodiment of the present invention will now be described in detail while referring to the accompanying drawings. It should be noted, however, that the present invention is not limited to this embodiment. Those skilled in the art will realize the concepts of the invention and that it can be implemented with various different embodiments. The same reference numerals are used throughout to denote corresponding or identical components.

For this example embodiment, the explanation given is mainly for the method or system of the invention; however, as will become apparent to one having ordinary skill in the art, the present invention can be provided not only as a method and a system but also a storage medium on which a computer-readable program can be stored. Therefore, the present invention can be implemented as hardware or software, or as a combination of the two. An example storage medium on which the program can be recorded is an arbitrary computer-readable storage medium, such as a hard disk, a CD-ROM, an optical storage device or a magnetic storage device.

Further, in this embodiment, a general computer system can be employed. The computer system used for this embodiment comprises a central processing unit (CPU), a main memory (RAM) and a nonvolatile memory (ROM), all of which are interconnected by a bus. In addition, a co-processor, an image accelerator, a cache memory and an input/output controller (I/O) may be connected to the bus. Further, an external storage device, a data input device, a display device and a communication controller are connected to the bus via an appropriate interface. Furthermore, this computer system can also include a hardware resource with which a computer system is generally equipped. An example external storage device can be a hard disk drive; however, the external storage device is not thereby limited, and may include a magneto-optical storage device, an optical storage device, or a semiconductor storage device, such as a flash memory. The data input device can be an input device, including a keyboard, a pointing device, such as a mouse, a pen input device or a tablet. The data input device can also include an image reader, such as a scanner, or a voice input device. An example display device can be a CRT, a liquid crystal display device or a plasma display device. Further, the computer system can be an arbitrary type of computer, such as a personal computer, a workstation or a main frame computer.

FIG. 1 is a block diagram showing an example information access system according to the embodiment of the present invention. This information access system comprises: character string generation means 1, a kana-kanji conversion module 2, an information access routine 3, common access means 4, an information source 5 and a results presentation means 6.

The character string generation means 1 generates a character string that is input to the system. In this embodiment, speech is example input data; however, a handwritten character, a character entered at a keyboard, or a number entered using the numeric keypad of a telephone set may also be employed as input data. The character string generation means 1 includes a voice input device 7 and a voice recognition engine 8, and the voice recognition engine 8 includes a phonemic pattern analysis means 9 and a grammar analysis means 10. The phonemic pattern analysis means 9 refers to a phonemic expression file 11, and the grammar analysis means 10 refers to a grammar file 12.

The voice input device 7 is a converter, such as a microphone, for converting a speech signal or an acoustic signal into an electrical signal. The speech signal obtained by the voice input device 7 is parsed by the voice recognition engine 8 to obtain phonemes to be applied for a corresponding character expression. The application of the phonemes to characters is performed by the phonemic pattern analysis means 9, while referring to the phonemic expression file 11. For application to the phonemic expression, grammar analysis is performed while referring to a grammar that has been defined in advance (recorded in the grammar file 12). This process makes it possible to eliminate the erroneous recognition of speech patterns.

The kana-kanji conversion module 2 includes a function for converting an input kana character string into kanji, as well as a homonym candidate selection routine 13. The kana-kanji conversion module 2 is generally provided as an input front end processor for a computer system.

The kana-kanji conversion module 2 is activated when, for example, the "kana-kanji conversion mode" is designated by entering an appropriate instruction at a keyboard or by entering a speech command or another command. The kana-kanji conversion is performed by depressing the conversion key at the keyboard, or by entering an equivalent speech command (e.g., by using a voice entry such as "conversion").

Since generally there are multiple kanji candidates that correspond to the kana character expression (multiple homonyms are present), the selection of a target kanji or a target kanji compound word is requested using the homonym candidate selection routine 13. In the homonym candidate selection routine 13, the first candidate is presented, or multiple inverted candidates are displayed or are highlighted. When the voice interface is employed, the target candidate and other candidates may be read orally, in order. To make a choice, or to change a previous conversion candidate, a user depresses an arrow key or a number key that corresponds to the number allocated for a candidate, or enters an equivalent speech command (e.g., voiced as "select the third candidate).

As is described above, when a character string has been entered, the first conversion candidate is immediately presented by selecting the kanji conversion process (through depression of the conversion key or the entry of the conversion speech command). In this embodiment, when the homonym candidate selection routine 13 is entered (i.e., the first conversion candidate is selected), or when another homonym is selected (i.e., the conversion candidate is changed), the information access (search operation) is automatically initiated, as will be described later. That is, when the kanji conversion is performed after a character has been entered, information access concerning the conversion candidate is automatically initiated. Specifically, an operation is not required to find an input field for a search (an information access) and for depressing a submit button (a transmission button) instructing a computer to perform a search operation. Thus, a visually impaired person can avoid the difficulties associated with a search operation (information access). Further, not only visually impaired persons, but also normal users can simplify the input operation for information access. The search operation (information access operation) will be described in detail later.

Figure 2:
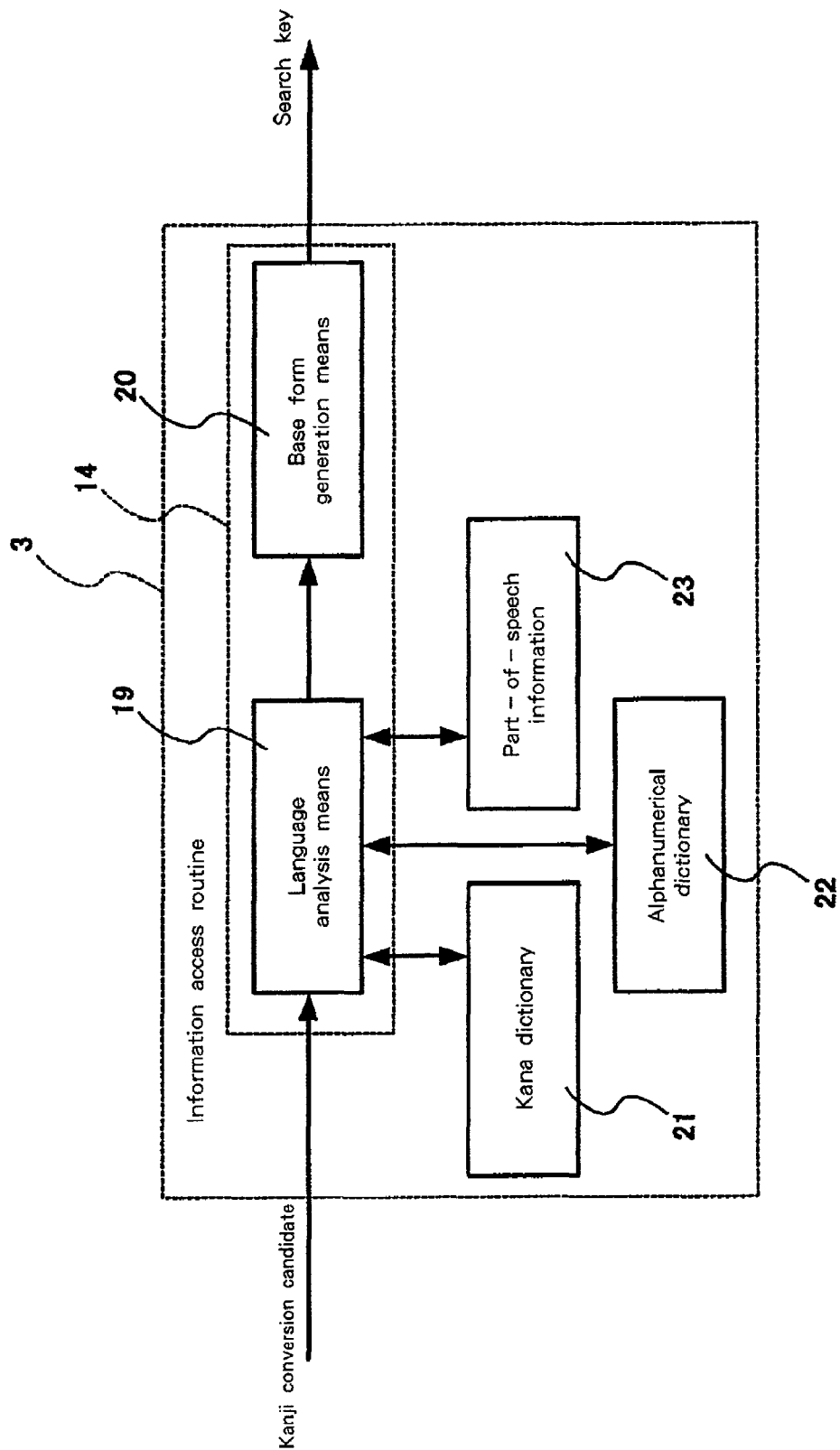
FIG. 2 is a block diagram showing the function of an information access routine.

When a user desires to make a specific choice (kanji conversion candidate), the information access routine 3 is performed to obtain information for the candidate from the information source 5. That is, in the information access routine 3, the candidate currently designated during the homonym candidate selection routine 13 (the first conversion candidate or the altered candidate) is received, and a search of the information source 5 is performed by using the current candidate as a key. FIG. 2 is a block diagram showing the functions of the information access routine 3. The information access routine 3 includes a language analysis routine 14, which includes language analysis means 19 and base form generation means 20. The language analysis routine 14 includes a function for acquiring the type, the base form and the grammatical information for a word candidate or for dividing a compound word. The base form of a word means an end form relative to a conjugation in Japanese, or a singular form relative to a plural form in English. The language analysis means 19 analyzes the language of a received candidate, parses the candidate if it is a compound word, and analyzes the character type and the grammar. Part-of-speech information 23 is referred to for the analysis. The base form generation means 20 generates the base form while referring to the language analysis results. The information obtained by analysis and the obtained base form are employed by the common access means 4. The functions of a kana dictionary 21 and an alphanumeric dictionary 22 are described later.

The common access means 4 provides standard access for the set of information sources 5. The common access means 4 refers to the context information obtained by a context information acquisition module 15, an information source definition file 16, a user profile 17 and a user dictionary 18.

The context information acquisition module 15 is a module associated with a search performed to obtain information concerning the environment for the search. Example context information is a position or a time. When the system of this embodiment is a portable information terminal, the position information can be obtained by a GPS (Global Positioning System), or when the system is a fixed terminal, the position information can be obtained while referring to user information, such as an area number, registered on a model panel.

An available information source and its attribute are written in to the information source definition file 16, an information source used by the user and its attribute is written in the user profile 17, and user information is stored in the user dictionary 18.

Figure 3:
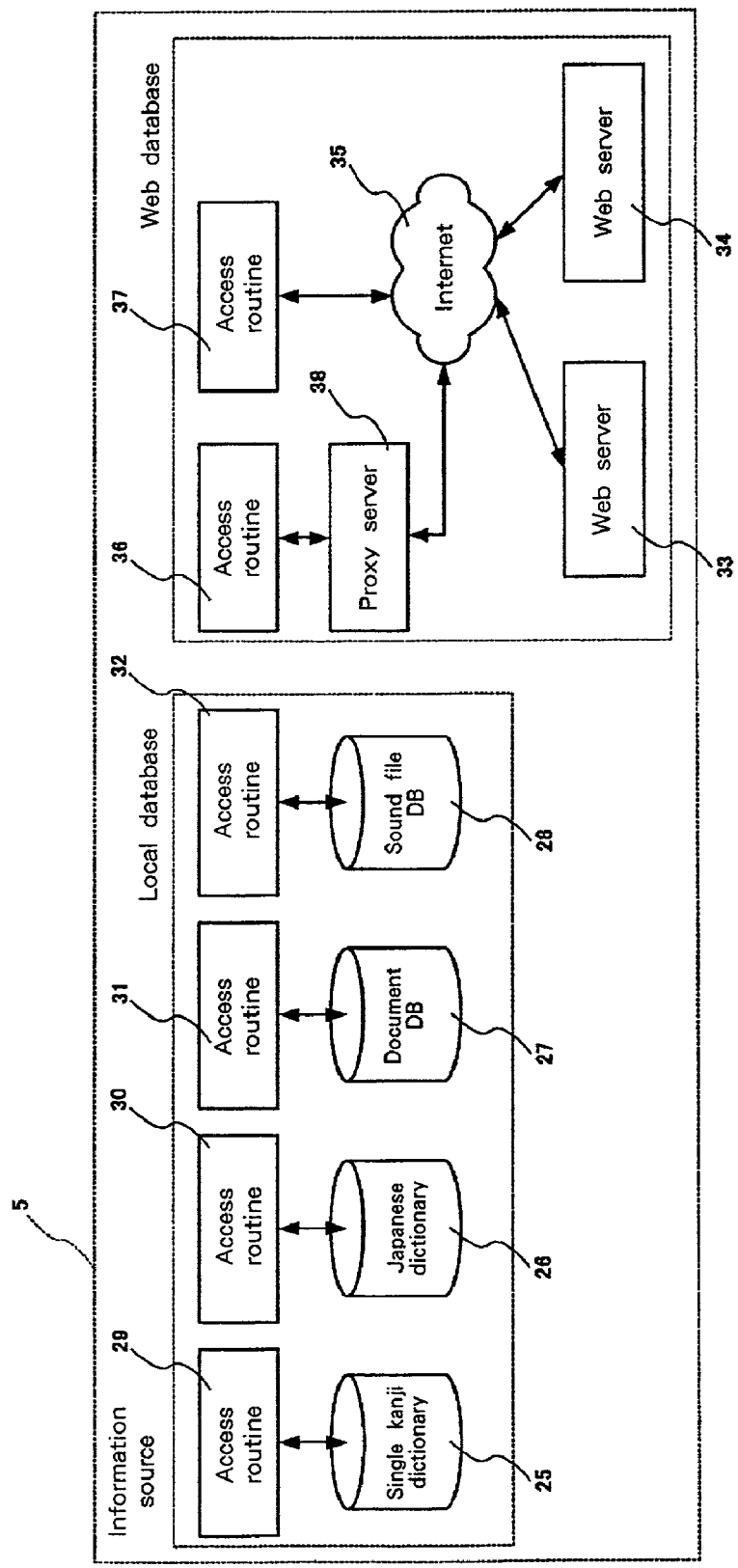
FIG. 3 is a conceptual block diagram showing an information source.

The information source 5 provides the contents for a designated key (a search key). FIG. 3 is a conceptual block diagram showing an example of an information source. The information source 5 is roughly sorted into a local database and a web database. In this embodiment, it is assumed that the local database is recorded in the same computer system that serves as the information access system; however, the local database need not be present in the same system. For example, the local database may be recorded in another computer system connected by a LAN (Local Area Network). The information on a web page that can be accessed via the Internet 35 is stored in the web database. Access routines 29 to 32, 36 and 37, which function as database interfaces, are included in the databases.

"TEXT_DICTIONARY" A text information or URL information is returned. For example, a single kanji dictionary 25 or a Japanese dictionary 26 in FIG. 3 corresponds to "TEXT_DICTIONARY".

"LOCAL_TEXT_SEARCH" The search results are returned relative to the local file. A document DB 27 in FIG. 3 corresponds to "LOCAL_TEXT_SEARCH".

"LOCAL_AUDIO_ACCESS" The sound database is accessed. The information to be returned is a wave file, or a sound file such as an MIDI or an MP3. A sound file DB 28 in FIG. 3 corresponds to "LOCAL_AUDIO_ACCESS".

"WEB_TRANSCODING_ACCESS" A designated URL (including a parameter, such as a keyword, if it is designated) is accessed, unnecessary information (an advertisement or a menu) and rendering information are removed from the contents, and modified information appropriate for oral reading is returned. This modification of the information is performed by a proxy server 38. Web servers 33 and 34, via the proxy server 38 in FIG. 3, correspond to "WEB_TRANSCODING_ACCESS".

"URL_DIRECT_ACCESS" The contents of the designated URL is returned unchanged. A text form appropriate for oral reading or speech information (a wave file) are employed, without the proxy server 38 intervening. The web servers 33 and 34, without the proxy server 38 intervening, in FIG. 3 correspond to "URL_DIRECT_ACCESS".

The contents of the information source 5 can basically include three elements: "text", "speech information", such as a sound file, and "URL (associated URL). When the contents are affected by the user context, the description for changing the priority level can be added.

To search the information source 5, it is necessary, depending on the information source 5, to designate a search while the homonym candidate is unchanged (WORD), or a search while a conjugation is analyzed and converted into the base form (its end form for Japanese or a singular form for English) (STEMMING). This designation is recorded in the information source definition file 16 for each information source. FIG. 4 is a table for an example information source definition file. The attributes of the information source are as follows.

"Internal name" This is the internal name of the information source, and is used for a description of the user profile.

"Name" This is the name of the information source, and is used to notify the user of the information source.

"Access module name" This is the access module name for the information source, and designates the name of a module used for accessing the information source. The access module is employed in accordance with the type of information source.

"Key type" This designates whether the search key is transmitted unchanged to the information source, or is changed to the base form before transmission.

"Parameter" A parameter, such as a dictionary file name, to be transmitted to the access module is designated.

Special dictionaries are as follows.

"USER_DICTIONARY" Candidates designated by the user are registered. The user dictionary 18 in FIG. 1 corresponds to "USER_DICTIONARY".

The following information sources are automatically generated from the language analysis results, without using the dictionary. These processes are performed in the information access routine 3.

"KANA_JISHO" When a selected word consists of all cursive kana characters (hiragana) or square kana forms (katakana), "hiragana" or "katakana" are returned respectively. The kana dictionary 21 in FIG. 2 corresponds to "KANA_JISHO".

"ALPHA_NUMERIC_JISHO" When a selected word consists of all alphabetical or numerical entries, the contents are returned. The alphanumeric dictionary 22 in FIG. 2 corresponds to "ALPHA_NUMERIC_JISHO".

"POS_INFORMATION" The part-of-speech information, such as the name of a person, the name of an organization, an adverb or a conjunction, is returned. For a part, such as a noun, the value is not returned. The part-of-speech information 23 corresponds to "POS_INFORMATION".

The information source desired by a user, and its attribute, are written in the user profile 17. The information sources 5 are written in the order of their priority level. FIG. 5 is a table showing an example user profile 17. The following attributes are therein designated.

"Access module name" The access module name is designated.

"Timing" This is search timing, and is used to designate either a constant search (ALWAYS), a search conducted only upon receipt of a request (IF REQUESTED), or a search conducted only when the search results are not obtained using a dictionary for which "ALWAYS" is designated (CATCH_ALL). When "CATCH_ALL" is not designated, the default setting for the system is employed, and certain search results are finally output.

"Beep tone" This is a tone used for notification when a candidate is found. Either NO_BEEP or BEEP is designated. Of parenthesis in "BEEP(X, Y, Z)", for example, a tone variation is designated for "X", a volume is designated for "Y" and a balance is designated for "Z". Further, a special sound effect, such as reverberation, echo or rotation, can also be designated.

"Synthesized sound quality" This is a voice quality (sound quality) for oral reading using speech synthesis. A male voice (MALE_VOICE(X)) or a female voice (FEMALE_VOICE(X)) is, for example, designated. A tone variation can be designated for "X" in the parenthesis, and the age generation of a speaker can be designated as a variation. For a sound file, "NA" is designated. Further, a special sound effect, such as reverberation, echo or rotation can be designated.

"Sound output method" This is a method for releasing sounds. For stereo (STEREO), whereas only a right loudspeaker (RIGHT) or only a left loudspeaker (LEFT) may be designated, for non-designation the value is "STEREO". In addition, the shifting of the sound source may be designated. For example, sounds may be released so that the sound source appears to move from right to left, from above to below, or from the rear to the front.

"Contents display key" As will be described later, at the default, all the contents of the information source may not be output. Thus, when a user desires to obtain all the contents of an information source, he or she depresses a key designated here, so that the contents are submitted.

"Output text through speech synthesis" The format of text to be output through speech synthesis is designated. "% S" is replaced with text for which the contents are returned by the information source, and "% K" is replaced with a word. The value for non-designation is "% S".

The results presentation means 6 submits, to a user, the information (the title, the contents and the associated information for the information source 5) obtained through the common access means 4. FIG. 6 is a block diagram showing an example for the results presentation means. In this embodiment, the results presentation means includes priority level determination means 39, element determination means 41, an audio player 42, speech synthesis means 43, sound effect means 44, a loudspeaker 46 and URL contents acquisition means 47.

The priority level determination means 39 determines the priority level for the output of the information from the obtained information source 5. The default order is that designated in the user profile 17. When the context information 40 is obtained by the context information acquisition module 15, the priority level can be changed while referring to this information 40.

The element determination means 41 determines the element of the obtained information, i.e., determines whether the information is text, sound data or a URL. The audio player 42 outputs speech information, such as a wave file, MIDI or MP3, and the speech synthesis means 43 converts the text to speech.

When, for example, as the result of a word search it is determined that the element is text, while the speech information (sound data) is obtained, the speech synthesis means 43 reads it orally, and the audio player 42 replays the data. When the URL is searched for and is independently designated, the contents at the URL are read orally by the speech synthesis means 43. However, since it may take time to access the contents at the URL, first, the fact that the URL has been found is supplied to the user, and when the user depresses the designated key, the URL contents acquisition means 47 accesses web contents 48 via the Internet. When text is the type of the designated URL, the contents are read orally by the speech synthesis means 43, while when a sound file (sound data) is designated, the data are replayed by the audio player 42.

When the URL is designated using the text or speech information (sound data), first the text or speech information is output. Then, when the designated key is depressed, the contents at the URL are output, as when the URL is independently designated, or an appropriate voice browser is employed upon the depression of another key for the reading of the contents of the URL orally.

For voice reproduction, the sound effect is performed by the sound effect means 44 in accordance with parameters designated in the user profile 17. A specific example process will be described later.

The results presentation means 6 may not only output the results by voice, but also by displaying images on the display device 49.

Figure 7:
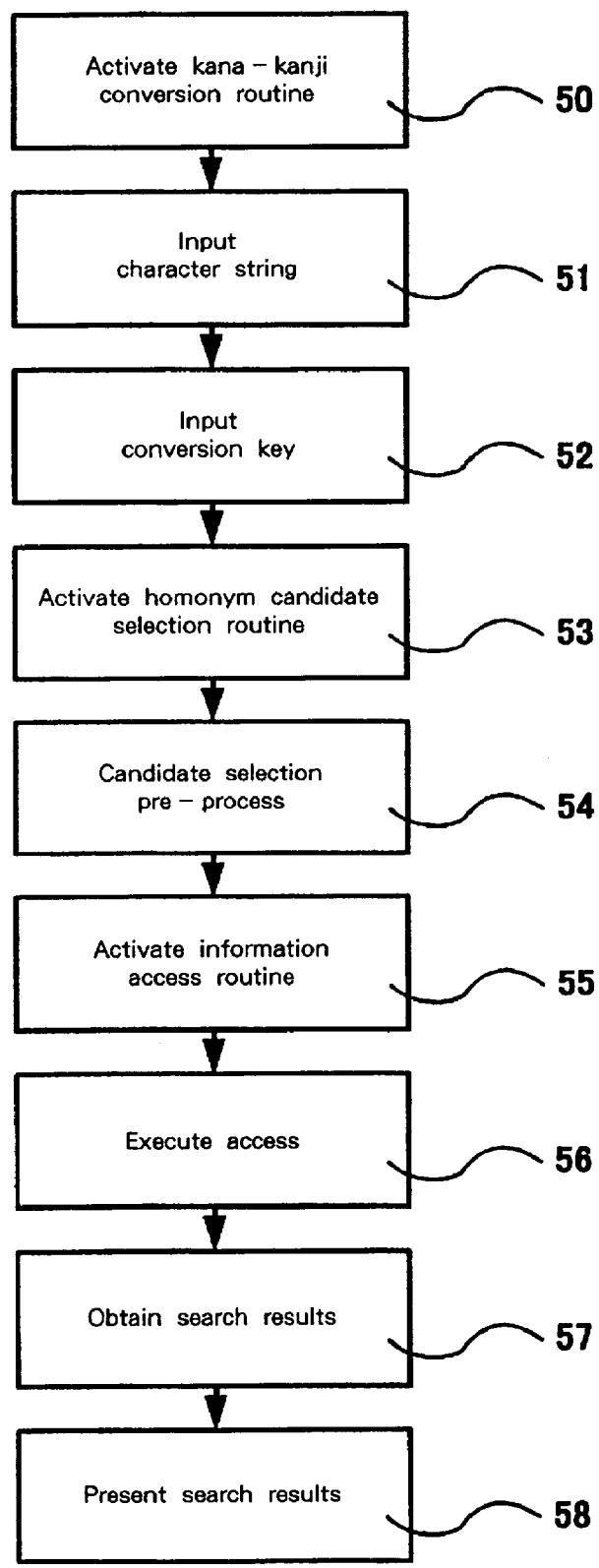
FIG. 7 is a flowchart for the overall information access method according to the embodiment of the invention.

The information access method of the embodiment will now be described while referring to the flowchart in FIG. 7. FIG. 7 is a flowchart for the overall information access method of this embodiment. First, when the kanji conversion mode is set, the kana-kanji conversion routine is activated (step 50), and a character string is input using voice, a keyboard or a graphic entry process (step 51).

Then, a conversion key is depressed to convert the input character string into kanji (step 52). Upon the depression of the conversion key, the homonym candidate selection routine is initiated (step 53), and the first conversion candidate is made. In response to this conversion candidate selection, the information access routine 3 is activated (step 55). It should be noted that when the user changes the conversion candidate, the information access routine 3 is also activated. In this specification, both the designation of the conversion candidate, immediately after the homonym candidate selection routine is activated, and the change in the conversion candidate, once the selection has been made, are collectively called a candidate selection pre-process (step 54). That is, as the candidate selection pre-process is begun, the information access routine 3 is activated (step 55).

Following this, the information access procedure is performed (step 56), and the search results (information obtained by an access) are acquired (step 57). Thereafter, the search results are presented (step 58).

That is, according to the information access method in this embodiment, the information access process (search) can be automatically performed by entering the character string and by the performance of the kana-kanji conversion operation. Thus, for the information access, an extremely simplified input means can be provided. Conventionally, a system designed for a normal person is not especially usable by a visually impaired person; however, a visually impaired person can easily access information by using the system and method of this embodiment.

Figure 8:
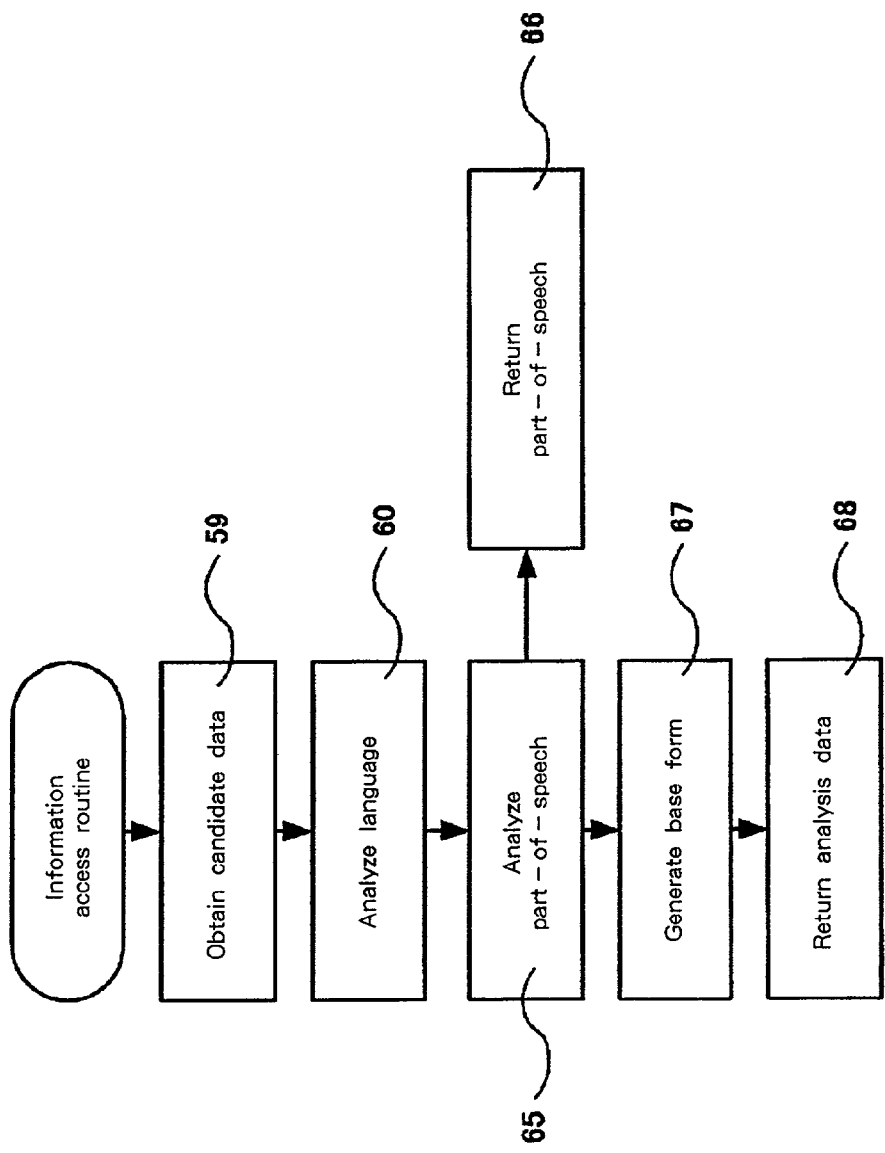
FIG. 8 is a flowchart for an example process step in the information access routine.

A detailed explanation will now be given for some steps. FIG. 8 is a flowchart showing the steps of the information access routine 3. When the information access routine is activated (step 55), candidate data are obtained (step 59). The candidate data are those that are designated during the homonym candidate selection routine.

Then, in the language analysis routine 14, the language analysis process is initiated (step 60). Through this analysis, a candidate type and grammar information are obtained. Then, the part of speech of the candidate is analyzed (step 65), and the name of the part-of-speech is returned (step 66).

It should be noted that the type of a kana or an alphanumerical character may be taken into account during the part-of-speech analysis. Further, when the candidate is a conjugation, the base form of the conjugation is generated (step 67). Thereafter the analysis results are returned (step 68) and this routine is terminated.

Figure 9:
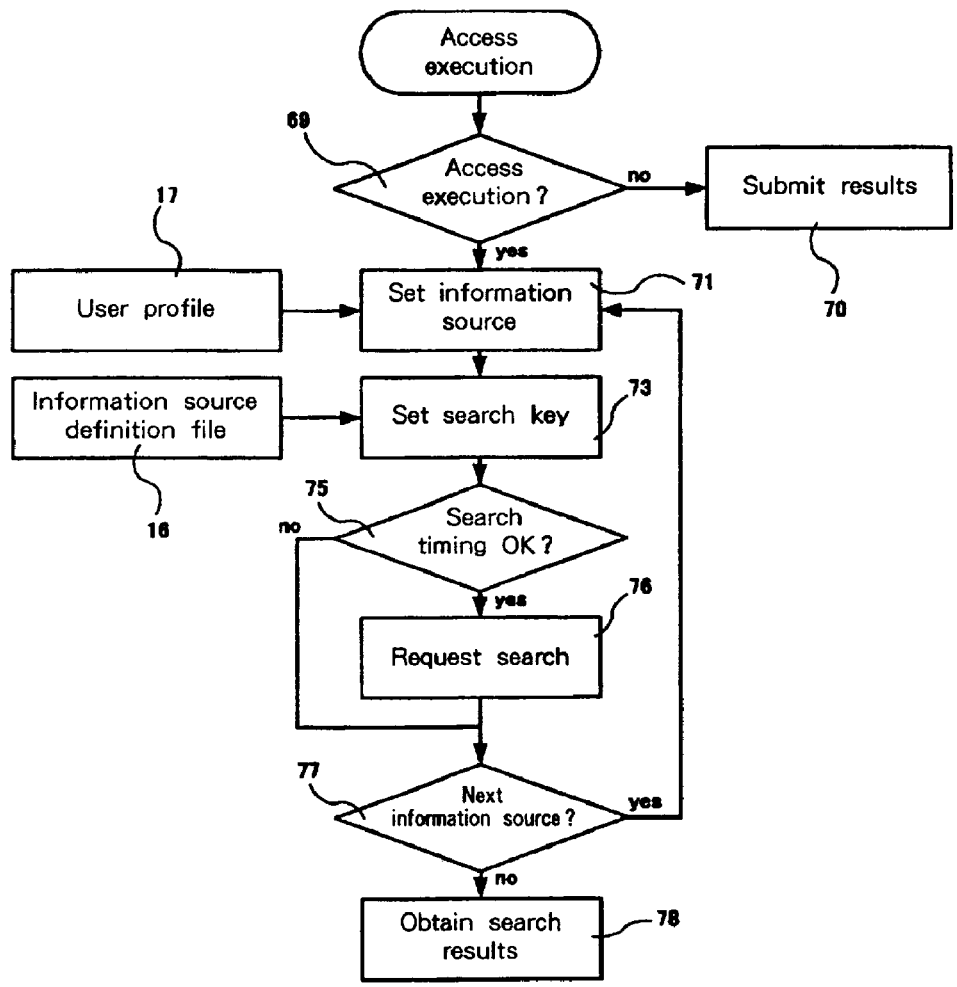
FIG. 9 is a flowchart for an example access execution step.

FIG. 9 is a flowchart showing the access execution step (step 56). First, a check is performed to determine whether the information source 5 is to be accessed (step 69). When, for example, the candidate consists of only numerals or kana characters, no access occurs, and the numeral, "hiragana" or "katakana" is transmitted as the search result to the results presentation means 6 (step 70).

Then, the information source to be accessed is set by referring to the user profile 17 (step 71), and a search key is set by referring to the "key type" in the information source definition file 16 (step 73).

Next, the search timing is determined (step 75). When the timing satisfies the condition, such as "ALWAYS" OR "CATCH_ALL", a search request is issued (step 76). In other cases, program control advances to step 77. The search request is issued by designating for the access module and another parameter the access routines of the individual information sources. In this embodiment, a standard access can be effected by the common access means 4.

Thereafter, a check is performed to determine whether the next information source is present (step 77). When a non-accessed information source is found, program control returns to step 71. But when no more information sources are found, program control advances to the results acquisition step (step 78).

Figure 10:
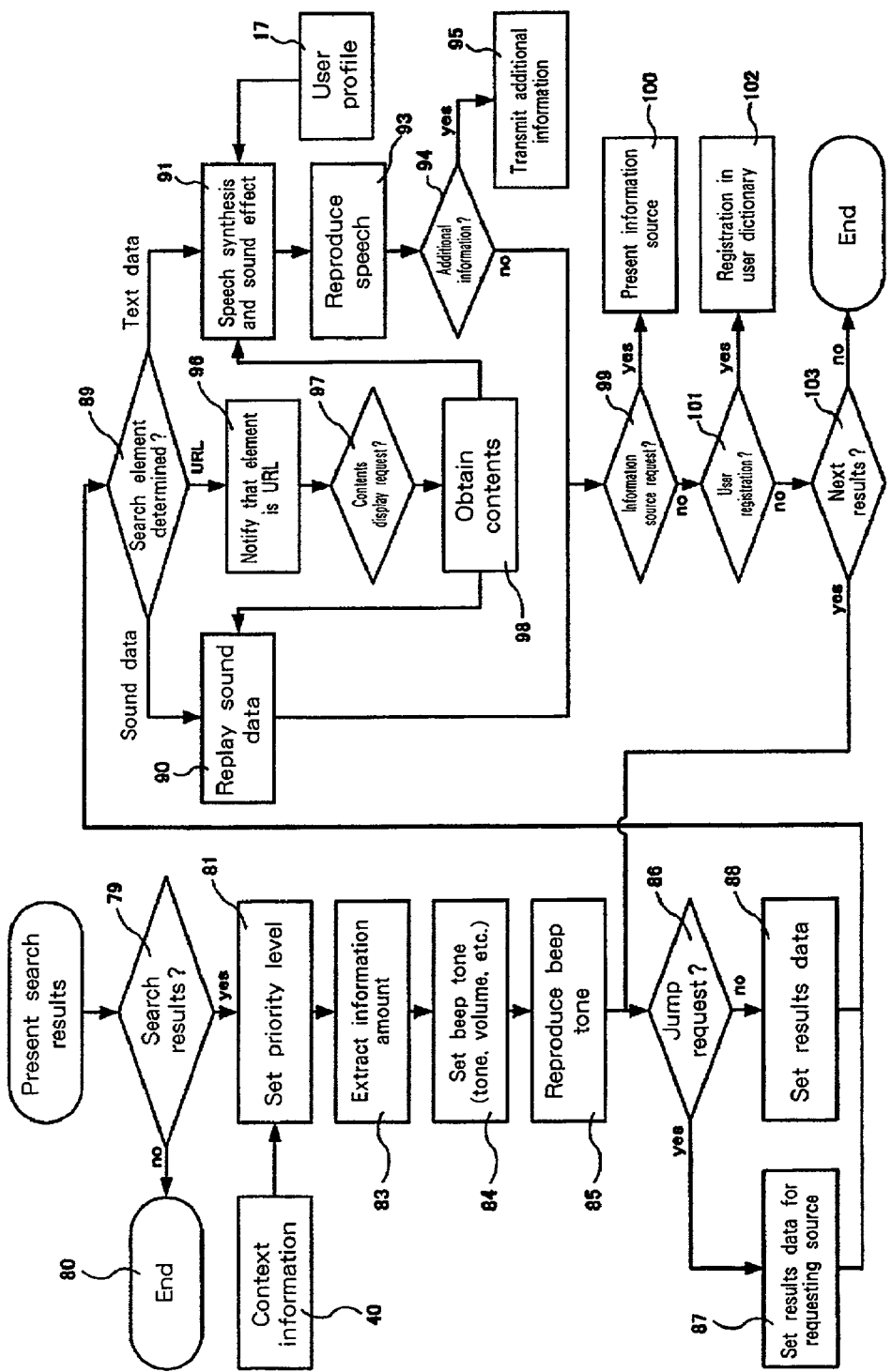
FIG. 10 is a flowchart for an example search results presentation step.

FIG. 10 is a flowchart for an example search results presentation step. First, a check is performed to determine whether search results have been obtained (step 79). When search results have been obtained, program control advances to step 81 to continue the results presentation process. But when the search results have not been obtained, the processing is terminated (step 80). At step 81, the priority level of the results is set (step 81). The results obtained from the information sources are presented in order beginning with the highest priority level of the information source designated in the user profile 17. It should be noted that the priority level can also be changed by referring to the context information 40. The amount of information accessed is extracted (step 83), and a beep tone is set (step 84) and reproduced (step 85). When information is obtained from many information sources, this information is fed back to the user. The "beep tone released when the candidate is found", which is designated in the user profile 17, is employed for the beep tone. Further, sound information indicating the amount of information is added to this beep tone. When, for example, the information is obtained from multiple information sources, the information is synthesized to form one tone information set, and the obtained tone information is output. So that, for example, tone "do" is allocated for the information source A and tone "mi" is allocated for the information source B, and the chord "do-mi" or a continuous tone "do-mi" is output. In addition, the volume can also be changed in accordance with the number of entries obtained from the information sources. When a great deal of information is obtained, a louder beep tone may be output.

When information, such as news having a low priority level, is obtained by the feedback of the beep tone, the user can directly jump to the contents of the information by depressing a jump key designated in the user profile 17 (steps 86 and 87). The first obtained information is set (step 88), and the element is determined for the obtained data (step 89). When the element is sound data, the sound data is replayed (step 90), or when the element is text data, the text data is read orally (steps 91 and 93). Before oral reading is performed, the user profile 17 is referred to for speech synthesis. Further, the oral reading process can be replaced with an appropriate sound effect (step 91). And when the URL is designated as additional information, for feedback to the user, a beep sound can be released during or at the end of the oral reading (steps 94 and 95).

When the element of the obtained information is a URL, a notification to that effect is provided for a user (step 96). And when the user issues a contents display request (step 97), the contents of the URL are obtained (step 98). For example, the contents of a web page can be obtained by issuing an HTTP request. Then, when the contents of the URL have been obtained, the sound data are replayed in accordance with the contents (step 90), or speech synthesis is used to read the contents orally (step 91).

While or after the obtained information is submitted, a user can depress a designated key to obtain, vocally, information concerning which information source has been accessed (steps 99 and 100). When multiple candidates are obtained and the user determines that a candidate that is not the first one is optimal, the user can depress the designated key to register the contents in the user dictionary (steps 101 and 102). Furthermore, at the same time as the user enters the text or speech, an entry unique to the user can be registered.

A check is then performed to determine whether there are results to be presented (step 103). If such result data are to be presented, program control returns to step 86. If no result data are to be presented, the processing is thereafter terminated.

For the presentation of the information, in addition to a sound presentation, the text data may be displayed. A specific information presentation example will now be given. This example can be implemented by using the system and the method of this embodiment; however, it is merely an example.

(1) Presentation of Information Concerning the Selection of a Homonym
1. To add part-of-speech information The conversion candidate "Tanaka" is orally read as "tanaka as a last name" (in the following representation, the conversion candidate is located to the left of the arrow, and the obtained information is located to the right of the arrow. In the above example, "Tanaka"→"tanaka as a last name").

For the other examples, "Aomori"→"aomori as a location", and "but"→"but as a conjunction".

2. To employ a recorded sound
Not only an explanatory sentence is recorded, but also a voice that can momentarily express the word is released. For example,
"dog"→"bowwow", "rain"→"pitter-patter"

3. To employ a dictionary
3.1. To orally read an authority "user interface"→"user interface as a computer term"
3.2. To orally read a dictionary definition "present"→"give an object to a person with one's regards"
"transmit"→"move an object from this side to the other side"

4. To employ an Internet search
Through an Internet search, the following additional information can be presented. First, the processing performed for an Internet search will now be briefly explained. 1. The search engine of a WEB is employed to perform a search using a chosen word as a key. 2. The number of hits is acquired by examining the search results. Thus, the usage frequencies for homonyms and for similar words can be obtained. 3. Sentences including the chosen word are enumerated. 4. An appropriate sentence, selected as an example, is filtered using proper heuristics, the conditions for which are such as, "a subject and a verb are included to form a complete sentence, the length of which is equal to or smaller than an appropriate number of characters, and like example sentences having the same beginnings and ends are omitted, while of those example sentences that have similar usage frequencies, only one can be employed".
5. Each time specific keys (e.g., [Ctl]+[Alt]+[right arrow]) are depressed, an enumerated example sentence is orally read, and this can include the oral reading of the title of a page. 6. At the time of the oral reading of an example sentence, appropriate additional information is expressed by using sound effects, such as (A), a "sound logo" corresponding to a major site that is released as the background for the information; (B), a specific tone (saxophone, piano, organ, etc.) that is allocated for a sorted site and that is the authority for the identification of an example sentence; and (C), according to the tag structure, the importance level of the information on a page is estimated, and an increased volume is used for important information (Hn, bold, table head, etc.) that is reproduced. Thus, information represented using an especially small font on a page can be audibly represented or skipped.

A specific example will now be described. Assume that whether "ainiku (unfortunately)" and "donataka (anyone)" should be described using kanji can not be decided from dictionary information. This can be determined in accordance with a difference in the number of hits during a search.

"ainiku"→19960 hits
"ainiku (described using kanji)"→4698 hits
"donataka" 73389 hits
"donataka (described using kanji)" 2269 hits Based on the number of hits, which usage should be selected is easily determined.

Further, a comparison of the number of hits can also be helpful in a case wherein there are different kanji descriptions having a similar definition.

"koen (lecture)"→111020 hits
"koen (dictation)"→1106 hits
"shikaku shogai (visually impaired)"→3884 hits
"shikaku shogai (described using different kanji)"→228 hits Further, sometimes it is not easy to determine a kanji ("okuru (send)" or "okuru (give)") to be used for "purezento wo okuru (send a present)" or for "purezento wo okuru (give a present)". However, it is convenient if an appropriate kanji can be employed, depending on the definition, while referring to the search information. Examples of case are shown below.

"purezento wo okuru (send a present)"→"(Will send a present to applicants selected as a result of a drawing conducted for those who dispatched an e-mail describing their impressions.) (Of course, we can send you a present by regular or standard mail, or by special mail, but if possible, we prefer the least expensive way.)".

"purezento wo okuru (give a present)"→"(I plan to give my friend a present for his coming-of-age celebration.) (I wonder what present you will give your mother on Mother's day?)" (In the above examples, two sets of information are shown for the same quotations as information provided to the right of the arrow).

Further, not many proper nouns are registered in the dictionary, and for celebrities, such as entertainers and baseball players, the information obtained by a search is very effective.

"K-mura T-ya"→"(3187 hits) (get T-ya BISTRO XXXX) (Don't miss [K-mura T-ya] on TV tomorrow!)"

"K-mura T-ya" (different kanji)"→"(875 hits) (page title: 2000 central league readers) (example sentence: (batting) K-mura T-ya (H shima))" (In this example, assume that the first "K-mura T-ya" is a famous entertainer, and the second "K-mura T-ya" is a famous baseball player. Three sets of information are shown at the same time in the quotations to the right of the arrow).

(2) Acquisition of News Information

The latest information and its keywords can be extracted by using "mySiteOutliner" described in "Information Outlining And Site Outlining," K. Takeda and H. Nomiyama, Int'l. Symp. On Research, Development And Practices In Digital Libraries (ISDL' 97), pp. 99–106 (1997). Thus, the information at the link corresponding to the keywords can be obtained. The examples for this are shown below. "AIX"→"([09/16] AIX 5L—about the next-generation AIX [III Japan (Internal)]) (http://www.jp.iii.com/NewsDB.nsf/2000/09132)" "C company"→"([09/20]III/the first SAN compatible product was announced with the tie-up with C company) [III Japan(Internal)] (http://www.jp.ii-i.com/NewsDB.nsf/2000/09191)""III"→"([09/20]III/ the first SAN compatible product was announced with the tie-up with C company) [III Japan(Internal)] (http://www.jp.iii.com/NewsDB.nsf/2000/09191)""campaign"→"([09/14]III summer lucky campaign; when you buy a computer, offer a pack of four Internet software products by 5,500 yen! [Club III]) (http://www.jp.iii.com/pc/clubiii/vspck0006.html)" The information corresponding to an input keyword can be obtained by using the above information. The URL is also provided for this information. When the user desires to obtain not only the title of the link but also more detailed information, the user need only depress a designated key to enable the access using an appropriate browser or oral reading software.

(3) Acquisition of Company Information and Product Information

The URL is allocated for a corresponding company name or a corresponding product name, the pertinent page can be directly accessed, the browser can be activated, and the browser reading software can be employed to read the page.

(4) Employment of a Search Engine

The search engine is accessed by using a designated word as a keyword, and the results are output by the transcoder proxy server in a form appropriate for oral reading. In this case, as well as in (2), the text and the corresponding URL can be obtained. The browser is activated to orally read information, and further information can be obtained.

(5) Oral reading

When new information is present for the keyword in the current text, the user can be notified of the presence by voice. Then, when the user depresses a specific key, the new information can be read orally. The navigation thereafter is performed in the same manner as described above.

The information access system and the method therefor have been explained by using the examples. According to the system and the method of this embodiment, the information can be easily searched for by using a simple input operation, and the obtained information can be output by voice. Further, depending on various output forms, the information is output not only in one dimension, but also more information can be expressed by voice and submitted to the user. Thus, a seamless system that is extremely useful, especially for visually impaired users, can be provided. The system and method of the embodiment are effective not only for visually impaired users, but also can provide means for easy accesses by users who are not very familiar with computer systems. Further, when the system and method of this embodiment are applied for a telephone set that normally has no display, or for a portable information terminal, such as a portable telephone or a PDA that has a small display, an effective information access can be implemented. For example, when a user who is at a specific location, such as New York, enters "Chinese food" using the system of the embodiment that is incorporated in a portable terminal, the restaurants in "New York restaurant database" are enumerated in the order of their priority level by referring to the context information, and the Chinese restaurants around New York are read orally.

The present invention has been specifically explained based on the embodiment, however, the invention is not limited to this embodiment, and can be variously modified without departing from the scope of the invention.

Figure 11:
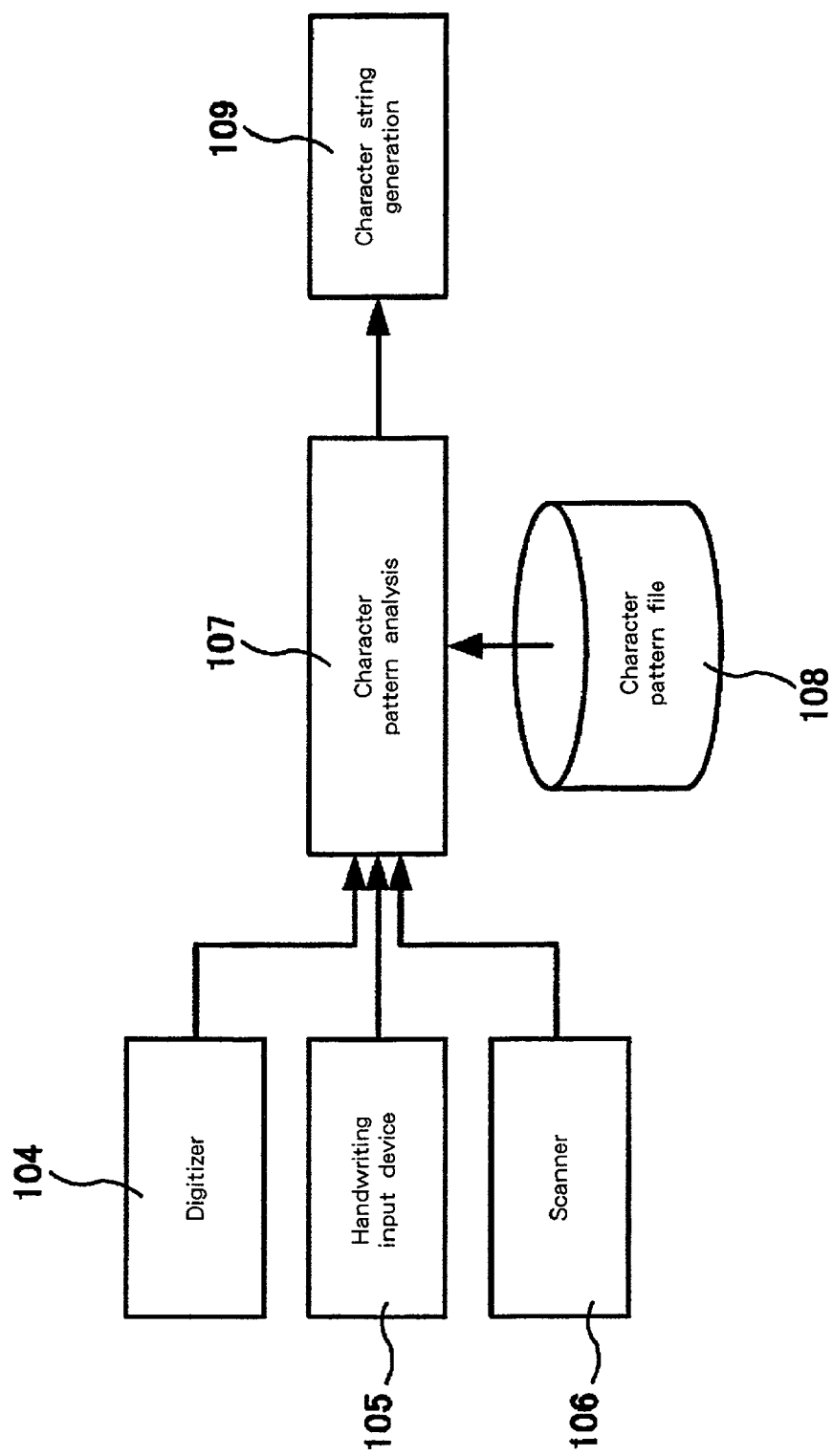
FIG. 11 is a block diagram showing another example character string generation means.

In the example embodiment, voice recognition has been employed as the character string input means. However, as is shown in FIG. 11, image recognition means can also be employed. Image information is entered by using a digitizer 104, a handwriting input device 105 or a scanner 106, and based on this information, a character string can be generated by character pattern analysis means 107 (109). It should be noted that a character pattern file 108 is referred to for the analysis of a character pattern.

Figure 12:
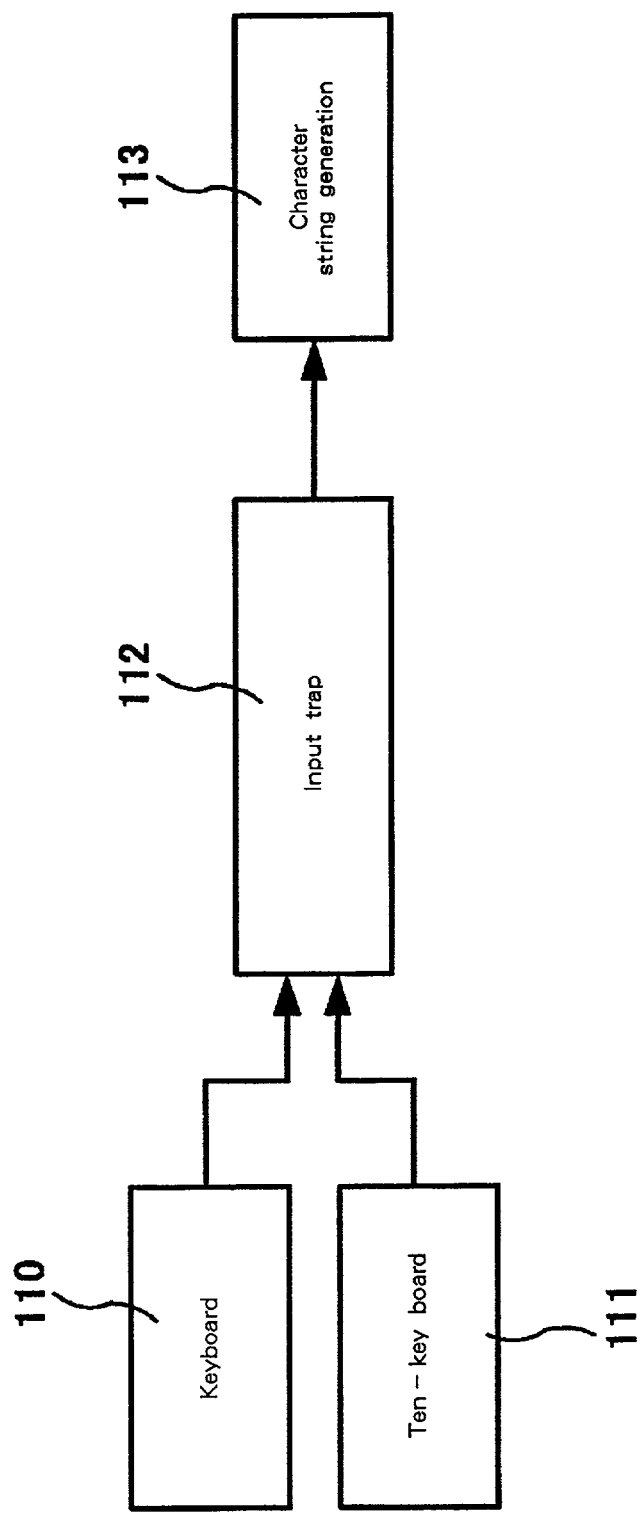
FIG. 12 is a block diagram showing an additional example character string generation means.

As is shown in FIG. 12, a character string can also be generated based on information entered at a common keyboard 110 or with a ten-key board 111. The ten-key board 111 includes the keys on a telephone set. When the limited keys on a telephone set are used to enter information, the numbers composed of several digits correspond to a kana character, and a kana character can be generated by entering the numbers to trap (enter) the character information in an input trap 112.

Figure 13:
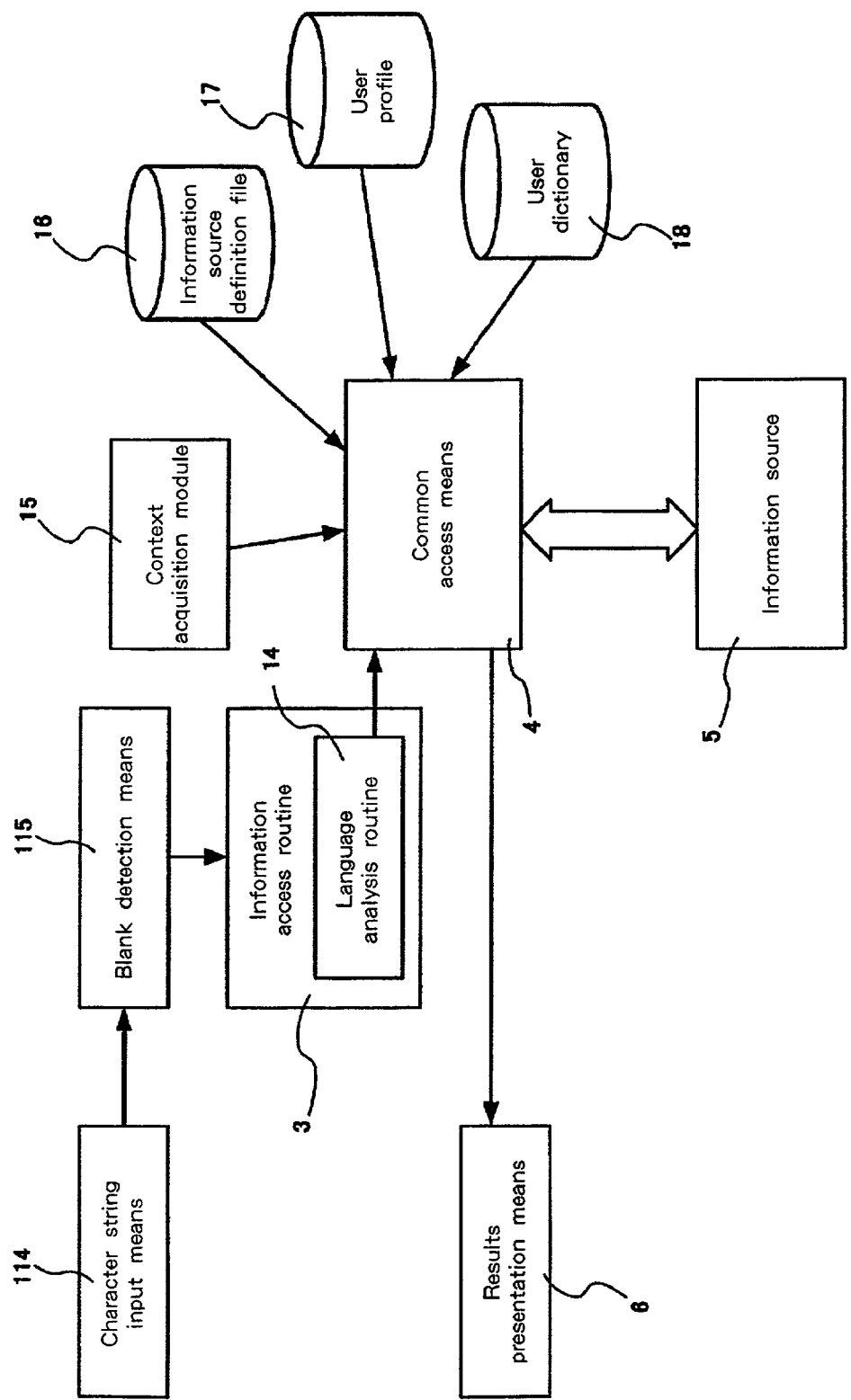
FIG. 13 is a block diagram showing one other example information access system according to the embodiment.
Figure 14:
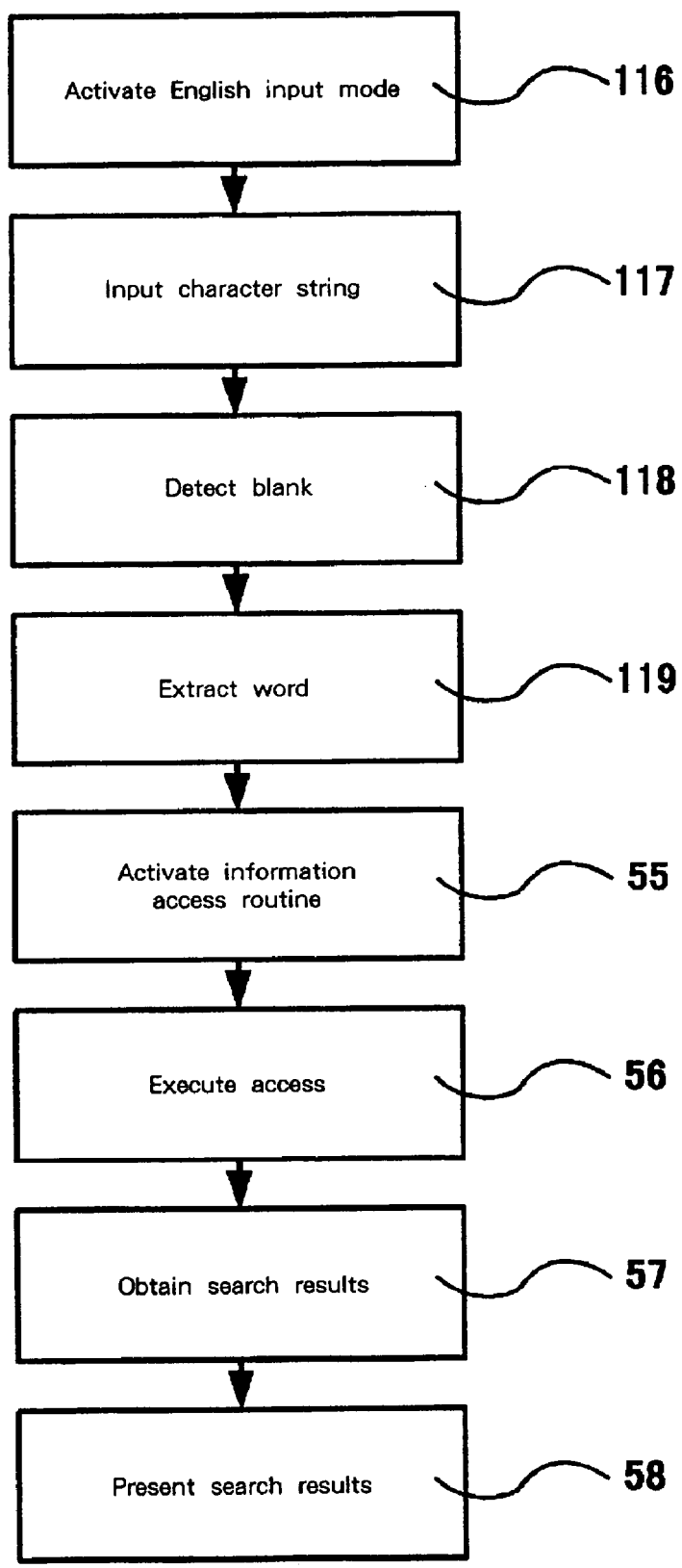
FIG. 14 is a flowchart for an additional example information access system of the embodiment.

In the above embodiment, on the assumption that Japanese is employed for the processing, information accesses have been initiated upon the depression of a kana-kanji conversion key; however, means by which information accesses may be effected are not limited to this one only. FIG. 13 is a block diagram showing an example information access system wherein it is assumed English or another language is employed for the processing and words are delimited by a control character. FIG. 14 is a flowchart for an example information access method wherein the processing is performed for English or another language and a control character is used to delimit words. For English, the words are delimited by a control character such as a space (blank). This control character is employed upon the initiation of the information access. First, the computer is activated in the English input mode (step 116), and then a character string (e.g., alphabetical characters) is entered using the same input means (character string input means 114) as in the above embodiment (step 117). Thereafter, the input character string is transmitted to blank (space) detection means 115 whereat spaces (blanks) are detected (step 118). By referring to the spaces (blanks), it is possible to ascertain that the characters sandwiched between a final space (blank) and a preceding space (blank) constitute a word, and the word can be detected (step 119). That is, the word can be extracted by depressing the blank key (space key), and at the same time, an information access routine can be activated (step 55). The other structure portions and the steps are the same as those in the embodiment. In the English mode, the generation of the base form in the language analysis routine corresponds to the conversion into, for example, a present form. In the above embodiment, the word is extracted using spaces and blanks; however, another character string, such as a tab, a carriage return or a line feed, may be employed.

ADVANTAGES OF THE INVENTION

The typical effects obtained by the invention are as follows. Since various types of information, such as definitions or actual examples, can be accessed, a homonym can be selected accurately and efficiently, regardless of the level of kanji knowledge and the age of a user. Since the selection of an information source can be performed by a user, an appropriate information source can be obtained. Further, since information obtained through a search can be fed back using sounds, even the latest information can be properly fed back. Thus, not only can a specific and active information search be performed, but also, non-specific and passive information can be obtained. For visually impaired users, the thus provided advantages are magnified.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An information access method comprising the steps of:
activating a kanji conversion module for converting a character or a character string into a kanji or into a character string that includes kanji;
entering a character or a character string;
using said kanji conversion module to instruct the conversion of said character or said character string;
employing, as a trigger, an instruction, or the selection of one of multiple conversion candidates presented by said kanji conversion module, in order to obtain, from an information source, information related to a conversion candidate that has been instructed or selected; and
using voice, or added sound effects, when presenting said obtained information; wherein said step of presenting the obtained information includes the steps of:
establishing an information presentation order while referring to a priority level recorded in a user profile or to context information for a user;
employing tone, volume or another sound effect to represent the number or quantities of information sources from which information has been acquired; and
changing said information presentation order at the time whereat a user enters a specific key.

2. An information access method comprising the steps of:
entering a character or a character string;
determining whether a control character is included in said character or said character string;
employing, as a trigger, detection of said control character to obtain, from an information source, information concerning a word that is delimited by said control character; and
using voice, or added sound effects, when presenting said obtained information, wherein said step of presenting the obtained information includes the steps of:
establishing an information presentation order while referring to a priority level recorded in a user profile or to context information for a user;
employing tone, volume or another sound effect to represent the number or quantities of information sources from which information has been acquired; and
changing said information presentation order at the time whereat a user enters a specific key.

3. The information access method according to claim 2, wherein said control character is one of a space, a blank, a tab, a carriage return or a line feed, or a combination thereof.

4. The information access method according to claim 1, wherein said character or said character string is entered using a first method based on voice recognition, a second method based on graphic character recognition, or a third method based on the use of a keyboard or a ten-key board.

5. The information access method according to claim 1, wherein said information source is a local database or a global database, connected to the internet, in which text data, sound data or URL data are stored.

6. The information access method according to claim 1, wherein said step of obtaining said information includes steps of:
performing a language analysis process, including one or multiple procedures employed for pausing a compound word included in a conversion candidate, a procedure for analyzing a part of a word included in a conversion candidate or a word delimited by said control character; and a procedure for obtaining the base of a word included in a conversion candidate or of a word delimited by said control character; and
searching said information source by using, as a key, the word included in a conversion candidate, the word delimited by said control character, the word obtained through language analysis, or the base form thereof.

7. The information access method according to claim 6, wherein said step of obtaining said information includes the steps of:
setting said information source while referring to a priority level recorded in a user profile;
setting a search key to be used for said information source while referring to an information source definition file; and
determining whether a search timing for said information source matches a condition for a search, and performing said search when the decision is affirmative.

8. The information access method according to claim 1, wherein said step of presenting the obtained information includes the steps of:
identifying the type of information or an element thereof; and
using voice to output text data or a text portion of data associated with a URL when it is ascertained that said information or said element is said text data or said URL, or replaying sound data or sound data included in said URL when it is ascertained that said information or said element is said sound data or said URL.

9. The information access method according to claim 8, wherein when it is ascertained that said information or said element is said URL, said information to the effect that said information or said element is said URL is represented, and then, upon the receipt of a request from a user, data associated with said URL is obtained.

10. The information access method according to claim 1, wherein said step of presenting the obtained information includes a step of presenting, upon the receipt of a request from a user, an information source that constitutes an information authority.

11. An article of manufacture comprising a computer usable medium having computer readable program code means embodied therein for causing information access, the computer readable program code means in said article of manufacture comprising computer readable program code means for causing a computer to effect the steps of claim 1.

12. An article of manufacture comprising a computer usable medium having computer readable program code means embodied therein for causing information access, the computer readable program code means in said auricle of manufacture comprising computer readable program code means for causing a computer to effect the steps of claim 2.

13. A program storage device readable by machine, tangibly embodying a program of instructions executable by the machine to perform method steps for information access, said method steps comprising the steps of claim 1.

14. A program storage device readable by machine, tangibly embodying a program of instructions executable by the machine to perform method steps for information access, said method steps comprising the steps of claim 2.

15. An information access system comprising:
a kanji conversion module for converting a character or a character string into a kanji or into a character string that includes kanji;
means for entering a character or a character string;
using said kanji conversion module to instruct the conversion of said character or said character string;
means for employing, as a trigger, the conversion of said character or said character string by said kanji conversion module, or the selection of one of multiple conversion candidates presented by said kanji conversion module, in order for a means for obtaining to obtain, from an information source, information related to a conversion candidate that has been instructed or selected; and means for using voice, or added sound effects, when presenting said obtained information; wherein said means for obtaining said information includes;

means for setting said information source while referring to a priority level recorded in a user profile;

means for setting a search key to be used for said information source while referring to an information source definition file; and means for determining whether a search timing for said information source matches a condition for a search, and performing said search when the decision is affirmative.

16. The information access system according to claim 15, wherein said means for entering said character or said character string is either first means for performing voice recognition, second means for performing graphic character recognition, or third means employing a keyboard or a ten-key board.

17. The information access system according to claim 15, wherein said information source is a local database or a global database, connected to the Internet, in which text data, sound data or URL data are stored.

18. The information access system according to claim 15, wherein said means for obtaining said information includes:

means for performing a language analysis process, including one or multiple procedures employed for parsing a compound word included in a conversion candidate, a procedure for analyzing a part of a word included in a conversion candidate or a word delimited by said control character, and a procedure for obtaining the base form of a word included in a conversion candidate or of a word delimited by said control character; and means for searching said information source by using, as a key, the word included in a conversion candidate, the word delimited by said control character, the word obtained through language analysis, or the base form thereof.

19. The information access system according to claim 15, wherein said means for presenting the obtained information includes:

means for establishing an information presentation order while referring to a priority level recorded user profile or to context information for a user;

means for employing tone, volume or another sound effect to represent the number or quantities of information sources from which information has been acquired; and means for changing said information presentation order at the time whereat a user enters a specific key.

20. The information access system according to claim 15, wherein said means for presenting the obtained information includes:

means for identifying the type of information or an element thereof; and means for using voice to output text data or a text portion of data associated with a URL when it is ascertained that said information or said element is said text data or said URL; and means for replaying sound data or sound data included in said URL when it is ascertained that said information or said element is said sound data or said URL.

21. The information access system according to claim 20, further comprising:

means for, when it is ascertained that said information or said element is said URL, presenting said information to the effect that said information or said element is said URL, and for, upon the receipt of a request from a user, obtaining data associated with said URL.

22. The information access system according to claim 15, wherein said means for presenting the obtained information includes:

means for presenting, upon the receipt of a request from a user, a source of the obtained information that constitutes an information authority.

23. A computer program product comprising a computer usable medium having computer readable program code means embodied therein for causing an information access system, the computer readable program code means in said computer program product comprising computer readable program code means for causing a co to effect the functions of claim 15.

24. An information access system comprising:

means for entering a character or a character string;

means for determining whether a control character is included in said character or said character string;

means for employing, as a trigger, detection of said control character to obtain, from an information source, information concerning a word that is delimited by said control character; and means for using voice, or added sound effects, when presenting said obtained information; wherein said step of presenting the obtained information includes the steps of:

establishing an information presentation order while referring to a priority level recorded in a user profile or to context information for a user;

employing tone, volume or another sound effect to represent the number or quantities of information sources from which information has been acquired; and changing said information presentation order at the time whereat a user enters a specific key.

25. The information access system according to claim 24, wherein said control character is one of a space, a blank, a tab, a carriage return or a line feed, or a combination thereof.

* * * * *